United States Patent Office 3,066,505
Patented Dec. 4, 1962

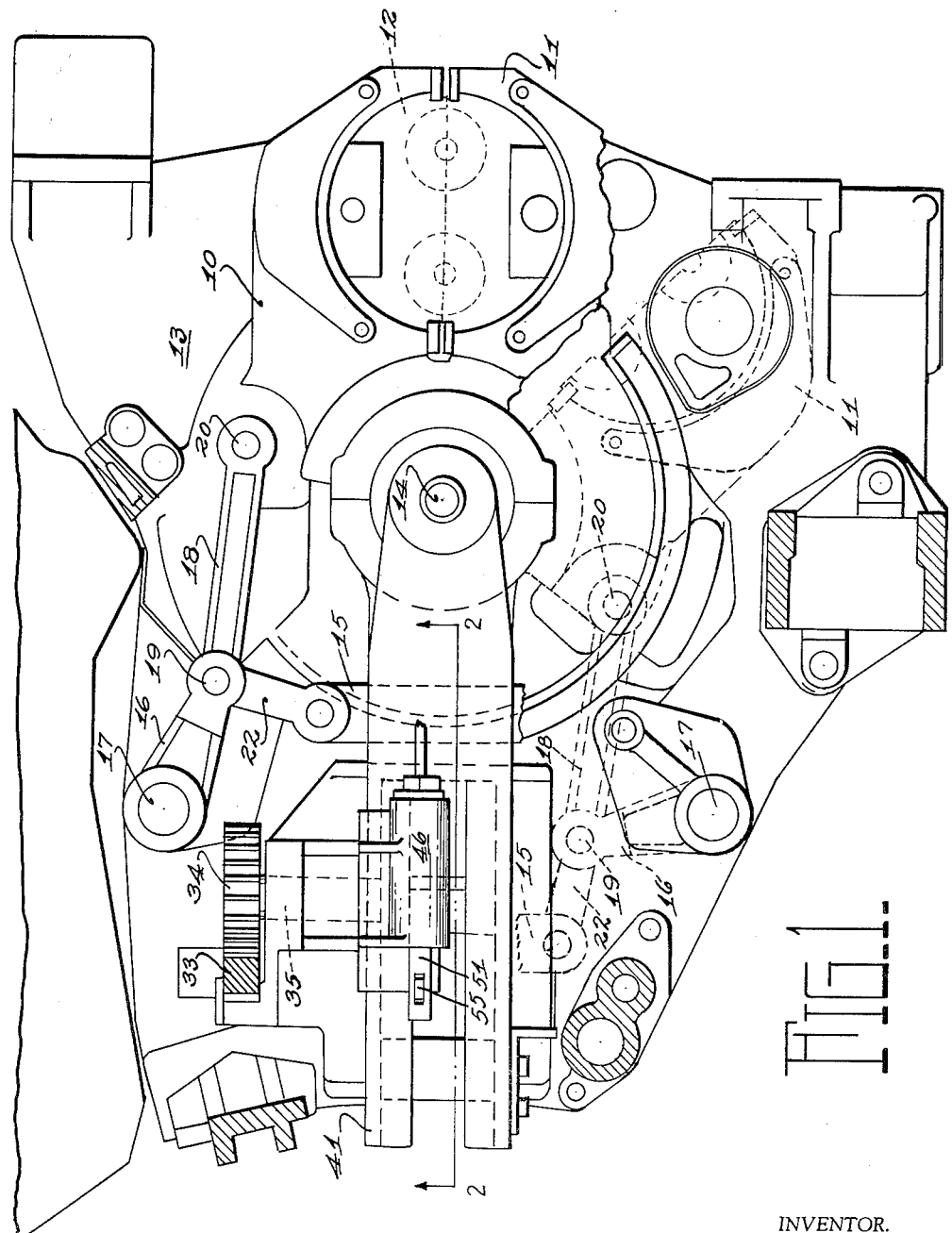

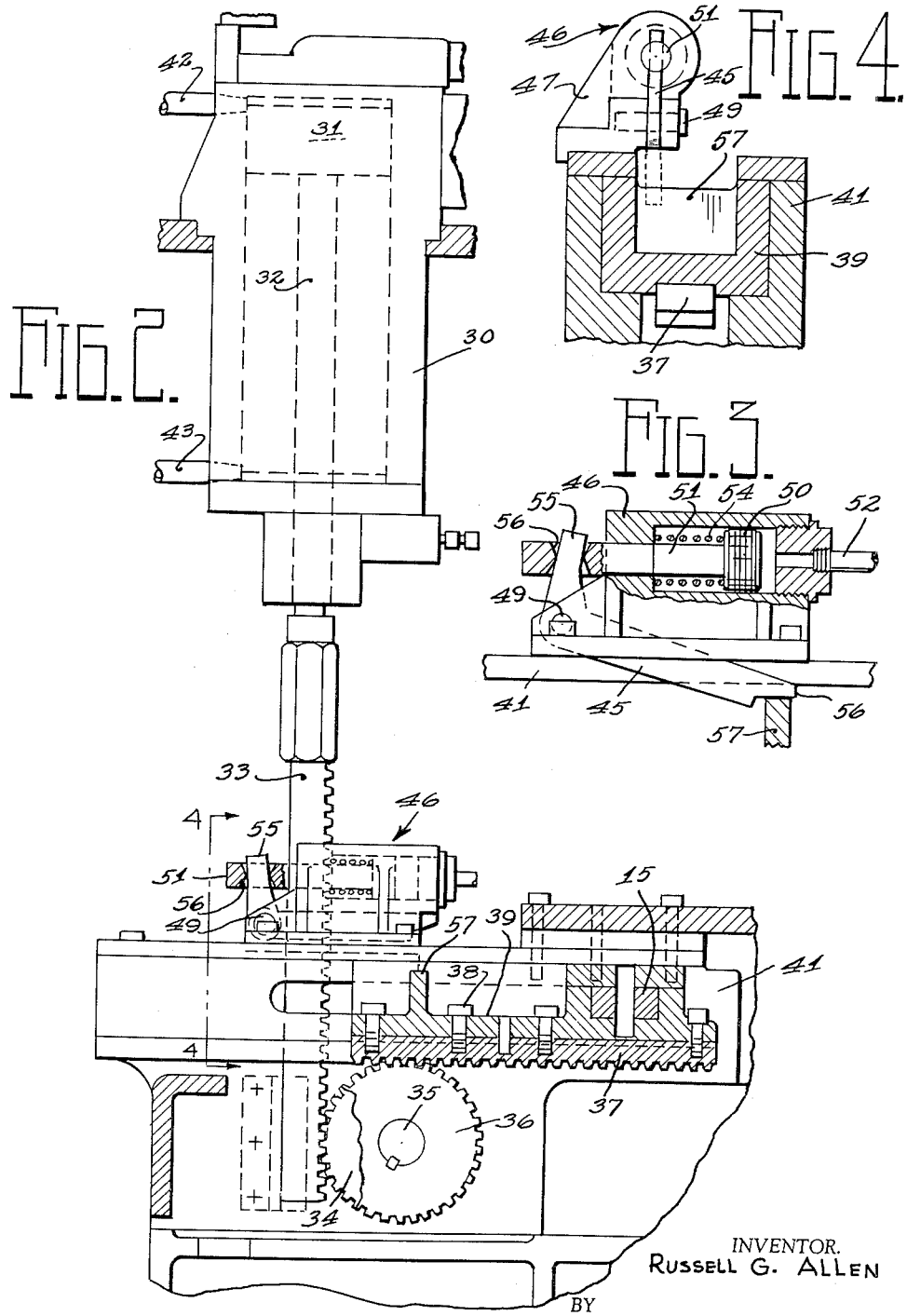

3,066,505
SAFETY DEVICE FOR MOLDING MACHINES
Russell G. Allen, Boynton Beach, Fla., assignor to Owens-Illinois Glass Company, a corporation of Ohio
Filed July 22, 1957, Ser. No. 673,504
5 Claims. (Cl. 65—159)

My invention relates to a safety device for use with machines for molding articles. In its preferred form as herein illustrated the safety device is used with and as a part of a machine for molding glass articles. The machine comprises partible molds, the mold sections being movable to and from a closed position by an air cylinder or motor. During the normal operation of the machine air pressure supplied to the motor operates automatically to move the mold sections to open and closed positions. If the pressure supply is shut off while the machine is running, the mold sections may move to open position. This may result in the machine being fouled by the molten glass which is being fed to the molds, or may cause interference of the mold with other parts of the machine, resulting in damage to the molds or other parts.

An object of the invention is to provide safety means to prevent false operation of the mold opening and closing motor.

A further object of the invention is to provide means for automatically preventing interference between the mold sections and the usual funnel guide, baffle or other parts of the machine when the air pressure supply for operating the molds is cut off.

Other objects of the invention will appear hereinafter.

Referring to the drawings:

FIG. 1 is a part sectional plan view of a molding unit including blank mold arms and their operating mechanism;

FIG. 2 is a part sectional elevation at the line 2—2 on FIG. 1;

FIG. 3 is a part sectional view of the safety latch and its operating means; and FIG. 4 is a section at the line 4—4 on FIG. 2.

The invention as herein shown is used with a glass blowing machine of the type shown in U.S. patent to Allen, 2,748,536, June 5, 1956, which patent illustrates a blank mold unit including a partible blank mold and its operating mechanism.

Referring to the accompanying drawings, blank mold arms 10 and 11 carry partible mold sections 12, shown in broken lines (FIG. 1). The mold arms are mounted in a mold carrier frame 13 for swinging movement about a pivot 14 to and from mold closing position. The mold arm 11 and operating linkage are shown in broken lines (FIG. 1) with the mold arm 11 swung to open position. A cross bar or yoke 15 movable toward and from the pivot 14, as presently described, has operating connections with each of the mold arms through linkage including rock arms 16 each mounted to swing about a pivot 17 on the frame 13 and connected to a link 18 by a pivot 19, the link 18 being connected by a pivot 20 to the mold arm. Links 22 connect the pivots 19 to the cross bar 15. When the bar 15 is moved forward it operates to swing the mold carrying arms to mold closing position.

Power for operating the mold arms is supplied by a motor 30 comprising a vertical cylinder. The motor may be operated by air pressure and is herein referred to as an air cylinder. The motor comprises a piston 31 and piston rod 32, the latter connected to a vertical rack bar 33 which runs in mesh with a gear 34 keyed to a horizontal shaft 35 journalled in the mold frame. The shaft 35 has keyed thereto a second gear 36 which meshes with a horizontal rack bar 37. The rack bar 37 is attached by bolts 38 to a slide 39. The slide is mounted for reciprocating movement in a slideway 41 on the mold carrying frame. The yoke 15 is connected to the slide 39 as shown in FIG. 2 and is reciprocated thereby. When the motor piston 31 is moved downward it operates through the gearing just described to retract the slide 39 and the attached yoke 15 thereby retracting the mold arms and opening the mold.

Air pressure for lowering the piston 31 and opening the mold is supplied through a pipe 42. Air pressure for closing the mold is supplied through a pipe 43 at the lower end of the motor cylinder.

When the air pressure is cut off either purposely or through failure of the air supply, the weight of the piston 31 and attached parts is sufficient to move the piston downward from mold closing to mold opening position. With the mold carriage rotating and the usual gob feeder supplying gobs of molten glass to the molds, such opening of the mold on failure of the air pressure supply may operate to foul the machine. Also the opening of the mold in this manner may cause interference between the mold and the usual funnel or baffle by which the gobs are directed into the mold, resulting in damage to the machine.

In order to prevent such operation of the motor a safety device is provided which is automatically brought into operation by the failure of the air pressure and prevents movement of the mold sections to open position. This safety device comprises a latch 45 which swings on a pivot 49 and is operated by a small piston motor 46. The motor cylinder as shown is formed on a bracket 47 mounted on the slideway 41. The motor 46 comprises a piston 50 and piston rod 51. The piston is moved forwardly by air pressure supplied through a pipe 52 which is connected to the same source of air pressure as the pipes 42 and 43 leading to the mold operating motor 30. A coil spring 54 mounted in the motor cylinder 46 is held under compression between the piston 50 and the forward end wall of the motor. The latch 45 includes an arm 55 extending upwardly from the pivot 49 through an opening 56 in the piston rod 51. When the piston 50 is in its retracted position (FIG. 3) the latch 45 is swung downward to a latching position in which the nose 56 of the latch seats on a stop 57. This stop as shown consists of a web formed on the slide 39. With the latch 45 down in its locking position it engages behind the web 57, thereby preventing the slide 39 from moving inwardly in a direction to open the mold.

The operation of the safety device is as follows:

When the air supply to the motor 30 and safety motor 46 is cut off the air pressure beneath the piston 31 and behind the piston 50 falls. As the falling pressure applied behind the piston 50 of the safety device reaches a certain point it permits the compression spring 54 to retract the piston and thereby swing the locking latch 45 down to its locking position (FIG. 3). This takes place while there is still sufficient pressure to hold the piston 31 of the mold operating motor 30 in its lifted position. As the pressure beneath the piston 31 is lowered further or reduced to zero the weight of the piston and connected parts is sufficient to move the piston downward to the mold opening position. This movement however is arrested by the locking latch 45 which engages behind the stop 57. This takes place before the mold is opened wide or when the mold has just cracked open slightly. This permits the usual funnel and baffle to deposit the mold charges or gobs without fouling the machine or causing interference of machine parts. When the air pressure is again turned on the locking latch 45, it is automatically lifted to its inoperative position.

Modifications may be resorted to within the spirit and scope of my invention.

I claim:
1. A machine comprising a device including partible sections, carrying arms in which said sections are mounted, a slide, means forming operating connections between the slide and the said carrying arms, said slide being operable when moved in one direction to move said sections apart and when moved in reverse direction to bring said sections together, a fluid operated motor comprising a vertical cylinder and a piston movable up and down therein, means providing operating connections between the motor piston and the slide for moving the slide to bring said sections together when the piston is moved upward and for moving the slide to separate said sections when the piston is lowered, means for conducting an operating fluid under pressure to the motor cylinder, said motor piston and connected parts being movable by gravity downward to a position to separate said sections when the fluid pressure is cut off, a safety device for limiting such downward movement when the pressure supply is cut off, said safety device comprising a holding latch mounted for movement to and from a holding position in which the latch is in the path of the slide, said safety device comprising a latch operating motor operable by the fluid pressure to hold the latch in a retracted position, and means for moving the latch into the path of said slide when the pressure supply is cut off from said piston motor.

2. The apparatus defined in claim 1, the latch operating motor comprising a piston operable by fluid pressure in a direction to hold the said latch in retracted position, and spring means operable when fluid pressure supply is reduced to move the latch operating piston in the reverse direction and thereby move the latch to said holding position.

3. A machine comprising a device including sections movable to and from a closed position, arms carrying said sections, a vertically disposed piston motor including a piston movable up and down, means providing operating connections between the motor piston and said arms for moving the latter to effect opening and closing said sections respectively by downward and upward movement of the piston, means for supplying fluid under operating pressure to the motor sufficient to effect reciprocating the piston, a locking latch movable into and out of operative position with respect to said first-mentioned means to limit the movement of the said arms, a latch operating motor operable by fluid pressure and connected to hold the latch in inoperative position, means connecting said latch motor to said fluid supplying means for concurrently actuating said latch motor with fluid pressure supplied to said piston motor for holding the latch in inoperative position, and means for moving the latch into said operative position upon failure of the said operating fluid pressure for the piston motor, whereupon the arms are held against opening said sections.

4. A machine comprising a device including partible sections movable to and from a closed position, carrying arms on which said sections are carried, means for moving said arms to and from said closed position, said means comprising a yoke and means providing operating connections between the yoke and said carrying arms, a vertically disposed piston motor comprising a motor cylinder and a piston movable up and down therein, means providing operating connections between the motor piston and said yoke, means for supplying fluid under pressure to the motor cylinder sufficient for lifting the piston and thereby moving said yoke and arms for moving the partible sections toward their closed position, said piston being movable downward under the force of gravity when the fluid pressure is cut off and thereby actuate said yoke and arms for moving the partible sections away from closed position, a locking latch movable into locking position for limiting the movement of said yoke, a fluid-operated motor operatively connected to the latch and operable for holding the latch in inoperative position, means connecting said latch operating motor for operation by said fluid supplying means concurrently with fluid pressure being supplied for operating said piston motor thereby holding the latch in inoperative position, means for moving the latch to locking position upon failure of the fluid pressure to said piston motor and thereby limiting movement of the motor piston in the downward direction, whereby movement of the partible sections away from the closed position is prevented.

5. A machine comprising a device including partible sections, carrying arms on which said sections are mounted and which are arranged for moving said sections into a cooperating closed position, a yoke mounted for movement toward and from said device, means providing operating connections between the yoke and said carrying arms and adapted to move said sections toward and away from said closed position, motor means connected to the yoke for driving the latter for closing said sections, said sections being partible with respect to each other upon failure of said motor means, a locking latch mounted for movement from a retracted position into a locking position for arresting said yoke, a fluid operated motor operatively connected to the latch and operated by fluid pressure supplied in response to the operation of the motor means to hold the latch in its retracted position, and spring means connected to the latch for moving it to locking position when the operating fluid pressure for the latch motor is reduced.

References Cited in the file of this patent
UNITED STATES PATENTS

| | | |
|---|---|---|
| 1,564,497 | Stenhouse et al. | Dec. 8, 1925 |
| 1,995,653 | Rowe | Mar. 26, 1935 |
| 2,198,767 | Glasner | Apr. 30, 1940 |
| 2,201,189 | Makaroff et al. | May 21, 1940 |
| 2,307,563 | Bridges | Jan. 5, 1943 |
| 2,584,534 | Barnhardtson | Feb. 5, 1952 |
| 2,702,444 | Rowe | Feb. 22, 1955 |
| 2,748,536 | Allen | June 5, 1956 |
| 2,837,872 | Brymer | June 10, 1958 |

FOREIGN PATENTS

| | | |
|---|---|---|
| 1,103,862 | France | June 1, 1955 |